United States Patent
Tomimatsu

Patent Number: 5,805,346
Date of Patent: Sep. 8, 1998

[54] FLUID IMMERSION MICROSCOPE OBJECTIVE LENS

[75] Inventor: Kei Tomimatsu, Tokyo, Japan

[73] Assignee: Nikon Corporation, Tokyo, Japan

[21] Appl. No.: 738,847

[22] Filed: Oct. 28, 1996

[30] Foreign Application Priority Data

Nov. 1, 1995 [JP] Japan ................................... 7-285367

[51] Int. Cl.$^6$ .................................................. G02B 21/02
[52] U.S. Cl. .......................................................... 359/656
[58] Field of Search ..................................... 359/656–661

[56] References Cited

U.S. PATENT DOCUMENTS

2,206,155  7/1940  Boegehold ............................... 359/659
3,530,436  9/1970  Bertele et al. ........................... 359/657

*Primary Examiner*—Georgia Y. Epps
*Assistant Examiner*—Jordan M. Schwartz
*Attorney, Agent, or Firm*—Klarquist Sparkman Campbell Leigh & Whinston, LLP

[57] ABSTRACT

Fluid-immersion microscope objective lenses are disclosed having simple construction, good image-plane flatness and ease of manufacturability. The most objectwise lens surface intended to contact the immersion fluid during use has a negative refractive power, and is preferably concave. The objective lens satisfies certain quantitative criteria.

16 Claims, 6 Drawing Sheets

FIG. 3

FLUID IMMERSION MICROSCOPE OBJECTIVE LENS

FIELD OF THE INVENTION

This invention pertains to microscope objective lenses, and more specifically, pertains to microscope objective lenses intended to be used with an immersion oil or other immersion fluid.

BACKGROUND OF THE INVENTION

A "fluid-immersion" microscope objective lens is a microscope objective lens intended to be used with an immersion liquid such as water or oil between the specimen and the most objectwise lens surface of the objective lens. With such lenses, it is generally believed that, if the lens surface in contact with the fluid (termed herein the "first face") is concave, air bubbles would annoyingly adhere to and be entrapped in (and thus be difficult to remove from) the concave void whenever the objective lens was used with an immersion fluid. As a result, fluid-immersion microscope lenses according to the prior art have a planar first face.

"Dry" objective lenses (i.e., microscope objective lenses intended to be used without an immersion liquid) are not subject to such bubble-entrapment.

To ensure the flatness of the image plane, it is necessary that the Petzval's sum of the objective lens be at or nearly zero. With dry objective lenses, it was possible to achieve such a goal by making the refractive index of the most objectwise lens of the objective (termed herein the "first lens") higher than that of air and to provide the first face with a high negative refractive power. In fact, it was possible to decrease a fairly large positive Petzval's sum in a dry objective using such an approach with only the first lens.

However, with conventional fluid immersion objectives having a planar first face, reducing the Petzval's sum of the objective to satisfactory levels has been elusive. Whenever the first face was planar, the refractive power of the first lens had to be higher in order to decrease a positive Petzval's sum. Also, a large negative spherical aberration at the planar first face would result if the difference in the refractive indices of the first lens and the immersion fluid was large.

In view of the foregoing, conventional approaches to improving image-plane flatness of fluid-immersion objectives include the following:

(1) Embedding and cementing a tiny plano-convex lens element, having a refractive power at or nearly at that of the immersion fluid, in the concave void of the first face, wherein the lens in which the tiny lens is embedded is a strong negative lens (having a convex surface oriented imagewise) made from a glass having a higher index of refraction that the immersion fluid. The planar surface of the tiny plano-convex lens element presented to the immersion fluid minimizes aberration effects and the strong refractive power of the surface to which the tiny lens is cemented helps reduce the positive Petzval's sum.

(2) In addition to (1), configuring the lens surface immediately adjacent, imagewise, the surface in which the tiny lens is embedded so as to fulfill aplanatic spherical conditions. A positive Petzval's sum in the objective lens is decreased by minimizing the aberration contribution of the most objectwise lens by having the principal role of the most objectwise lens being that of converging the light flux from the specimen, and by arranging the more imagewise lens groups into doublet and/or triplet Gaussian groups. If correction of the Petzval's sum remains insufficient despite the foregoing, the cemented lens discussed above in (1) is used as the first lens group of the objective.

Unfortunately, approach (1) requires extremely precise control of manufacturing tolerances to make a tiny lens element for embedding that had a high refractive power, and to satisfactorily cement such a tiny lens to the next lens element in the objective lens.

In addition, whenever a Gaussian arrangement is used for the more imagewise lens groups in approach (2), above, the objective lens not only becomes prohibitively complex, but also rays passing through the objective lens had to be strongly refracted by a concave surface having a high refractive power. Such lenses are unfortunately extremely susceptible to manufacturing errors.

SUMMARY OF THE INVENTION

The foregoing shortcomings of the prior art are solved by fluid-immersion microscope objective lenses according to the present invention. Such lenses comprise a most objectwise lens element having a surface (i.e., "first face") oriented toward the object side that is intended to contact the immersion fluid during use. The first face generally has a negative refractive power, and specifically is concave.

The microscope objective lens of the present invention also preferably satisfies at least one of the following Conditional Expressions:

$|n_0 - n_1| > 0.1,$ $|n_0 - n_1| > 0.15,$ $|n_0 - n_1| > 0.2,$ $2 > |r_1/e| > 0.54,$ and $1.5 > |r_1/e| > 0.6,$ wherein $r_1$ is the curvature radius and e is the effective diameter of the lens surface that contacts the immersion fluid, $n_1$ is the refractive index of the most objectwise lens element, and $n_0$ is the refractive index of the immersion fluid.

Other features and advantages of the present invention can be ascertained by reference to the following drawings and detailed description.

DETAILED DESCRIPTION

As used herein, the "object side" of an objective lens is the axial region situated between the objective lens and an object intended to be viewed using the lens. The "image side" is the axial region situated between the objective lens and any image formed by the lens. "Objectwise" refers to an orientation toward the object; "imagewise" refers to an orientation toward the image. In optical diagrams provided herein, the object side is on the left and the image side is on the right relative to the objective lens.

The present invention provides, inter alia, fluid-immersion microscope objective lenses having a simpler optical configuration than prior-art objective lenses. Objective lenses according to the present invention also exhibit excellent image-plane flatness and are easy to manufacture.

In fluid-immersion microscope objective lenses according to the present invention, the first lens L1 has a negative refractive power and the first face $r_1$ is concave. These features are shown generally in FIG. 1.

Figure 1:
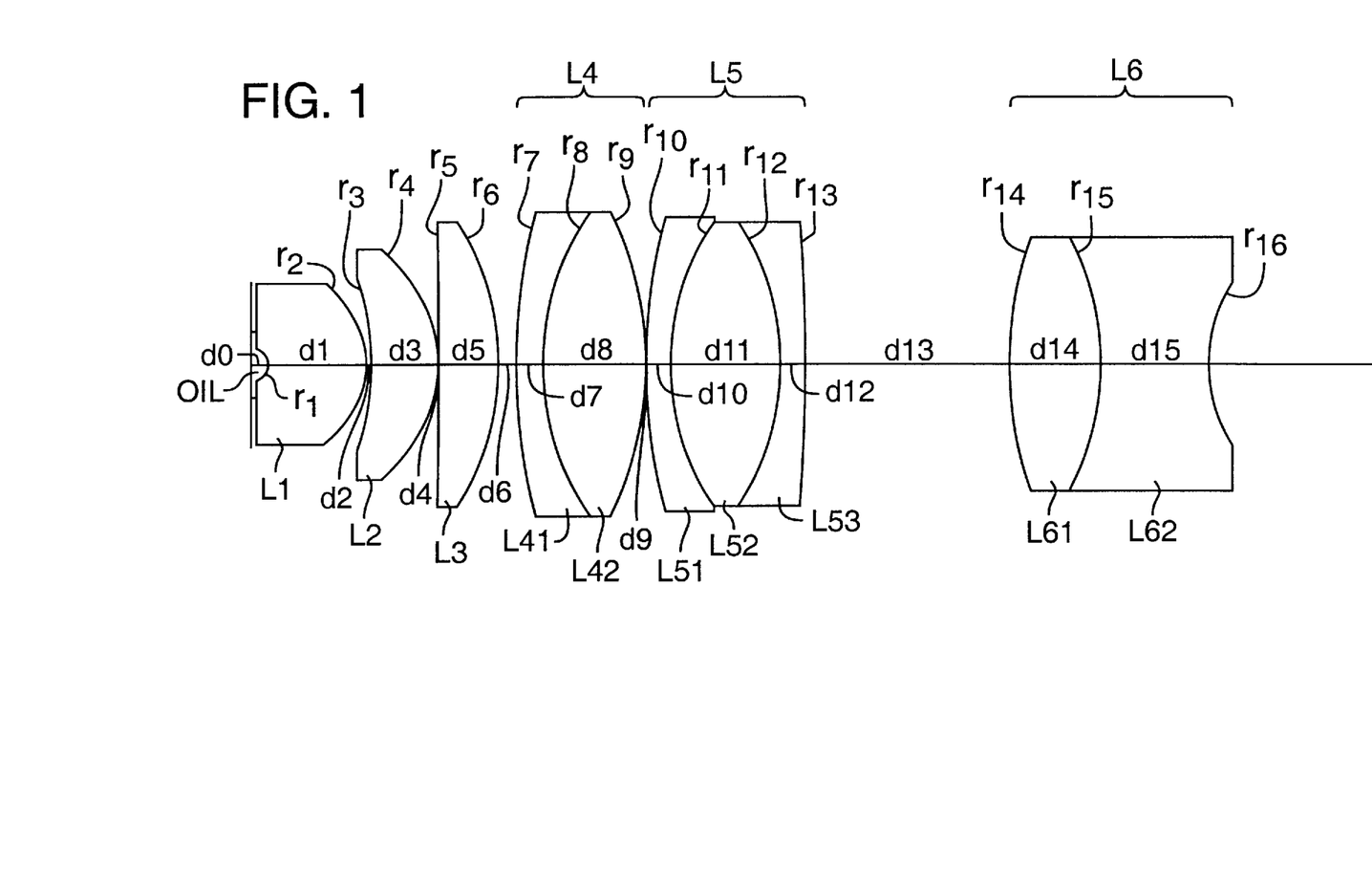
FIG. 1 is an optical diagram of Example Embodiment 1 of the present invention and also shows certain general features of objective lenses according to the present invention.

Tests were conducted of objective lenses according to the present invention using test methods as known in the art. The results of such tests revealed that air bubbles tended not to be entrapped in the concavity of the first face $r_1$. Furthermore, any bubbles that did remain were easily removable. As a result, fluid-immersion objective lenses according to the invention can be practicably used in the same manner as conventional fluid-immersion objective lenses having a planar first face, whether the immersion fluid is a low-viscosity fluid such as water or a relatively high-viscosity fluid such as oil.

By making the first face $r_1$ concave, the refractive index of the first lens L1 can be higher than that of the immersion fluid, and the first lens L1 can have a negative refractive power. These features permit much better correction of the Petzval's sum of the objective lens as well as provide good suppression of negative spherical aberration at the first face.

In addition to the foregoing features, it is preferred that an objective lens according to the present invention satisfy the following Conditional Expressions:

$$|n_0 - n_1| > 0.1 \quad (1)$$

$$2 > |r_1/e| > 0.54 \quad (2)$$

Conditional Expression (1) pertains to effectively minimizing the Petzval's sum of the objective lens. In Conditional Expression (1), $n_1$ is the refractive index of the first lens L1, and $n_0$ is the refractive index of the immersion fluid. If $|n_0 - n_1|$ were to fall below the limit of Conditional Expression (1), then the difference in the stated refractive indices would be too small, the curvature radius of the first face required to obtain a suitable negative refractive power would be prohibitively small, and a large aberration would occur.

Further with respect to Conditional Expression (1), even better results can be obtained if the limit of Conditional Expression (1) is 0.15; and extremely good results can be obtained if the limit is 0.2. In addition, since better results are obtained if $n_1 > n_0$, it is preferred that $n_1 > n_0$.

Conditional Expression (2) pertains to establishing a particularly suitable curvature radius for the first face. In Conditional Expression (2), $r_1$ is the curvature radius of the first face (i.e., the surface that contacts the immersion fluid), and e is the effective diameter of the first face. Exceeding the upper limit of Conditional Expression (2) would cause $r_1$ to be extremely large; this would make it difficult to obtain a negative Petzval's sum. Falling below the lower limit of Conditional Expression (2) would cause $r_1$ to be extremely small; this would make it easier for bubbles to remain in the concavity of the first face that could not be ignored.

Further with respect to Conditional Expression (2), even better results can be obtained if the lower limit is 0.6 and the upper limit is 1.5.

Incidentally, the effects of fluctuations in refractive index due to changes in temperature of the immersion fluid are currently no greater, within a practical temperature range, than in the past.

As shown generally in FIG. 1, it is preferred that lens elements imagewise of the first lens L1 be arranged into doublet or triplet Gaussian groups for even better reduction in any positive Petzval's sum.

Example Embodiments

In the following description, f is the overall focal length of the objective lens (but see below); N.A. is the numerical aperture of the objective lens; β is the magnification of the objective lens; r is the curvature radius of the corresponding lens surface; d is the axial distance between adjacent lens surfaces; n is the refractive index of the corresponding lens element relative to the D line; υD is the Abbe number of the corresponding lens element (for D-line light); e is the effective diameter of the first face of the first lens L1; Σp is the Petzval's sum of the objective lens; and B.f. is the back focus of the objective lens.

The objective lenses of Example Embodiments 2 and 3 provide correction to infinity. As a result, a 200-mm focal length imaging lens (eyepiece lens) is used with each objective lens on the image side in order to produce an image and for measuring aberrations. Consequently, in Example Embodiments 2 and 3, f denotes the focal length of only the objective lens; whereas in Example Embodiment 1, f denotes the focal length of the objective lens together with the imaging lens, and Σp represents the Petzval's sum of the objective lens together with the imaging lens.

Figure 2:
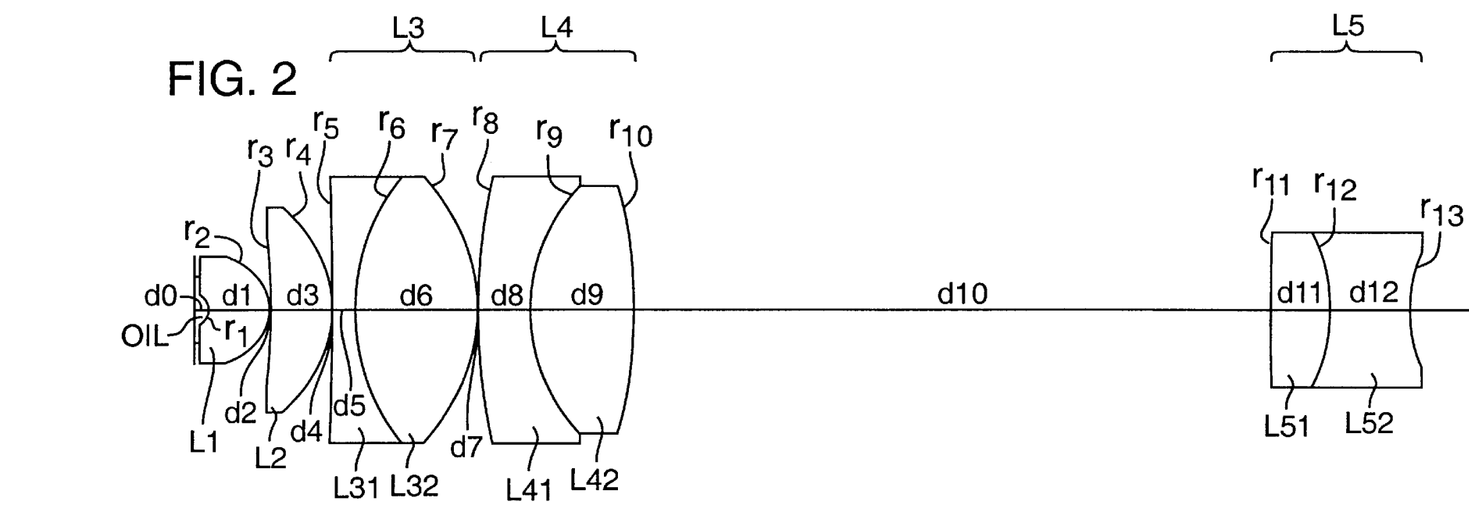
FIG. 2 is an optical diagram of Example Embodiment 2.
Figure 3:
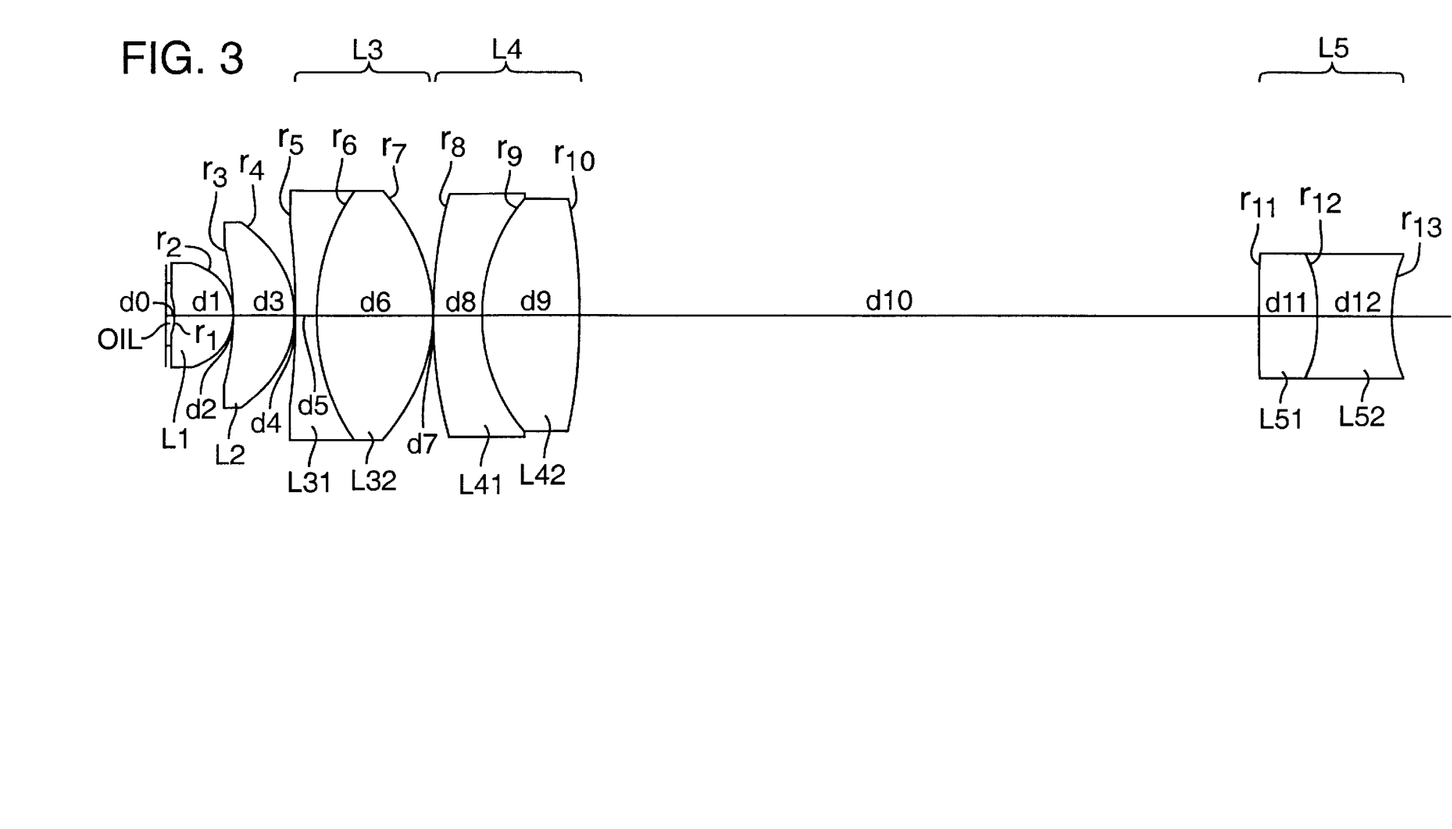
FIG. 3 is an optical diagram of Example Embodiment 3.

FIGS. 1–3 are optical diagrams of the objective lenses of Example Embodiments 1–3, respectively.

Example Embodiment 1

As shown in FIG. 1, the microscope objective lens of Example Embodiment 1 comprises, in order from the object side, a meniscus lens element L1 having a concave surface $r_1$ ("first face") facing the object side; a meniscus lens element L2 having a concave surface $r_3$ facing the object side; a meniscus lens element L3 having a concave surface $r_5$ facing the object side; a cemented doublet lens L4 having an overall biconvex profile and including a meniscus lens element L41 having a convex surface $r_7$ facing the object side and a biconvex lens element L42; a cemented triplet lens L5 having an overall biconvex profile and including a meniscus lens element L51 having a convex surface $r_{10}$ facing the object side, a biconvex lens element L52, and a meniscus lens element L53 having a concave surface $r_{12}$ facing the object side; and a cemented doublet lens L6 having an overall meniscus profile and having a convex surface $r_{14}$ facing the object side and including a biconvex lens element L61 and a biconcave lens element L62. In this Example Embodiment, the first face $r_1$ is intended to contact an immersion fluid such as oil.

Table 1 sets forth various specifications for Example Embodiment 1. Table 1 includes data pertaining to the cover glass and the immersion oil.

TABLE 1

| Overall Specifications | | | | |
|---|---|---|---|---|
| f = | 3.93 mm | | N.A. = | 1 |
| β = | 40 | | B.f. = | 146.111 mm |

Lens Specifications

| Lens Element | Curvature Radius (mm) | Axial Distance (mm) | Refractive Index | Abbe No. |
|---|---|---|---|---|
| c. glass | r = ∞ | d = 0.17 | | |
| oil | r = ∞ | $d_0$ = 0.63 | $n_0$ = 1.51536 | |
| L1 | $r_1$ = −0.8 | $d_1$ = 4.8 | $n_1$ = 1.77279 | $υ_{D1}$ = 49.45 |
| L1 | $r_2$ = −4.7194 | $d_2$ = 0.24 | | |
| L2 | $r_3$ = −14.756 | $d_3$ = 3.2 | $n_2$ = 1.49782 | $υ_{D2}$ = 82.52 |
| L2 | $r_4$ = −7.305 | $d_4$ = 0.1 | | |
| L3 | $r_5$ = −475.022 | $d_5$ = 2.9 | $n_3$ = 1.49782 | $υ_{D3}$ = 82.52 |
| L3 | $r_6$ = −13.3198 | $d_6$ = 0.9 | | |
| L41 | $r_7$ = +29.923 | $d_7$ = 1.3 | $n_{41}$ = 1.74000 | $υ_{D41}$ = 28.23 |
| L42 | $r_8$ = +13.371 | $d_8$ = 5 | $n_{42}$ = 1.43388 | $υ_{D42}$ = 95.57 |
| L42 | $r_9$ = −17.365 | $d_9$ = 0.1 | | |

TABLE 1-continued

| | | | | | | | |
|---|---|---|---|---|---|---|---|
| L51 | $r_{10}$ = +29.923 | $d_{10}$ = 1.2 | $n_{51}$ = 1.75520 | $v_{DS1}$ = | 27.56 |
| L52 | $r_{11}$ = +12.897 | $d_{11}$ = 5.3 | $n_{52}$ = 1.43388 | $v_{DS2}$ = | 95.57 |
| L53 | $r_{12}$ = -12.897 | $d_{12}$ = 1.2 | $n_{53}$ = 1.52682 | $v_{DS3}$ = | 51.35 |
| L53 | $r_{13}$ = -74.937 | $d_{13}$ = 10 | | | |
| L61 | $r_{14}$ = +18.193 | $d_{14}$ = 4.5 | $n_{61}$ = 1.61750 | $v_{D61}$ = | 30.78 |
| L62 | $r_{15}$ = -13.6502 | $d_{15}$ = 5.3 | $n_{62}$ = 1.52682 | $v_{D62}$ = | 51.35 |
| L62 | $r_{16}$ = -7.7701 | | | | |

Conditional Expressions

| | | | |
|---|---|---|---|
| $\Sigma p$ = | 0.027 | $e$ = | 1.234 mm |
| $r_1/e$ = | 0.648 | $n_0-n_1$ = | -0.257 |

Example Embodiment 2

As shown in FIG. 2, the microscope objective lens of Example Embodiment 2 comprises, in order from the object side, a meniscus lens element L1 having a concave surface $r_1$ ("first face") facing the object side; a meniscus lens element L2 having a concave surface $r_3$ facing the object side; a cemented doublet lens L3 having an overall meniscus profile and having a concave surface $r_5$ facing the object side and including a biconcave lens element L31 and a biconvex lens element L32; a cemented doublet lens L4 having an overall biconvex profile and including a meniscus lens element L41 having a convex surface $r_8$ facing the object side and a biconvex lens element; and a cemented doublet lens L5 having an overall meniscus profile and having a concave surface $r_{13}$ facing the image side and including a biconvex lens element L51 and a biconcave lens element L52. In this Example Embodiment, the first face $r_1$ is intended to contact an immersion fluid such as oil.

Table 2 sets forth various specifications for Example Embodiment 2. Table 2 includes data pertaining to the cover glass and the immersion oil.

TABLE 2

Overall Specifications

| | | | |
|---|---|---|---|
| f = | 2 mm | N.A. = | 1.25 |
| β = | 100× | B.f. = | ∞ |

Lens Specifications

| Lens Element | Curvature Radius (mm) | Axial Distance (mm) | Refractive Index | | Abbe No. |
|---|---|---|---|---|---|
| c. glass | r = ∞ | d = 0.17 | | | |
| oil | r = ∞ | $d_0$ = 0.57 | $n_0$ = 1.51536 | | |
| L1 | $r_1$ = -0.9515 | $d_1$ = 3 | $n_1$ = 1.79631 | $v_{D1}$ = | 40.90 |
| L1 | $r_2$ = -2.6701 | $d_2$ = 0.1 | | | |
| L2 | $r_3$ = -42.155 | $d_3$ = 3 | $n_2$ = 1.56907 | $v_{D2}$ = | 71.31 |
| L2 | $r_4$ = -6.2813 | $d_4$ = 0.1 | | | |
| L31 | $r_5$ = -74.550 | $d_5$ = 1 | $n_{31}$ = 1.74950 | $v_{D31}$ = | 35.19 |
| L32 | $r_6$ = +10.092 | $d_6$ = 6 | $n_{32}$ = 1.56907 | $v_{D32}$ = | 71.31 |
| L32 | $r_7$ = -9.3997 | $d_7$ = 0.1 | | | |
| L41 | $r_8$ = +30.759 | $d_8$ = 2.5 | $n_{41}$ = 1.79504 | $v_{D41}$ = | 28.57 |
| L42 | $r_9$ = +8.6535 | $d_9$ = 5 | $n_{42}$ = 1.48563 | $v_{D42}$ = | 85.20 |
| L42 | $r_{10}$ = -25.800 | $d_{10}$ = 31.2 | | | |
| L51 | $r_{11}$ = +42.603 | $d_{11}$ = 3 | $n_{51}$ = 1.67270 | $v_{DS1}$ = | 32.17 |
| L52 | $r_{12}$ = -7.9380 | $d_{12}$ = 4 | $n_{52}$ = 1.51454 | $v_{DS2}$ = | 54.55 |
| L52 | $r_{13}$ = +7.1062 | | | | |

Conditional Expressions

| | | | |
|---|---|---|---|
| $\Sigma p$ = | 0.118 | $e$ = | 1.415 mm |
| $r_1/e$ = | 0.672 | $n_0-n_1$ = | -0.281 |

Example Embodiment 3

As shown in FIG. 3, the microscope objective lens of Example Embodiment 3 comprises, in order from the object side, a meniscus lens element L1 having a concave surface $r_1$ ("first face") facing the object side; a meniscus lens element L2 having a concave surface $r_3$ facing the object side; a cemented doublet lens L3 having an overall meniscus profile and a concave surface $r_5$ facing the object side and including a biconcave lens element L31 and a biconvex lens element L32; a cemented double lens L4 having an overall biconvex profile and including a meniscus lens element L41 having a convex surface $r_8$ facing the object side and a biconvex lens element L42; and a cemented doublet lens L5 having an overall meniscus profile and a concave surface $r_{13}$ facing the image side and including a biconvex lens element L51 and a biconcave lens element L52. In this Example Embodiment, the first face $r_1$ is intended to contact an immersion fluid such as oil.

Table 3 sets forth various specifications for Example Embodiment 3. Table 3 includes data pertaining to the cover glass and the immersion oil.

TABLE 3

Overall Specifications

| | | | |
|---|---|---|---|
| f = | 2 mm | N.A. = | 1.25 |
| β = | 100× | B.f. = | ∞ |

Lens Specifications

| Lens Element | Curvature Radius (mm) | Axial Distance (mm) | Refractive Index | | Abbe No. |
|---|---|---|---|---|---|
| c. glass | r = ∞ | d = 0.17 | | | |
| oil | r = ∞ | $d_0$ = 0.5 | $n_0$ = 1.51536 | | |
| L1 | $r_1$ = -2 | $d_1$ = 3 | $n_1$ = 1.77279 | $v_{D1}$ = | 49.45 |
| L1 | $r_2$ = -2.6703 | $d_2$ = 0.1 | | | |
| L2 | $r_3$ = -13.946 | $d_3$ = 3 | $n_2$ = 1.56907 | $v_{D2}$ = | 71.31 |
| L2 | $r_4$ = -5.5058 | $d_4$ = 0.1 | | | |
| L31 | $r_5$ = -45.502 | $d_5$ = 1.1 | $n_{31}$ = 1.74950 | $v_{D31}$ = | 35.19 |
| L32 | $r_6$ = +11.529 | $d_6$ = 6 | $n_{32}$ = 1.56907 | $v_{D32}$ = | 71.31 |
| L32 | $r_7$ = -9.4517 | $d_7$ = 0.1 | | | |
| L41 | $r_8$ = +25.231 | $d_8$ = 2.5 | $n_{41}$ = 1.79504 | $v_{D41}$ = | 28.57 |
| L42 | $r_9$ = +9.4517 | $d_9$ = 5 | $n_{42}$ = 1.48563 | $v_{D42}$ = | 85.20 |
| L42 | $r_{10}$ = -33.393 | $d_{10}$ = 35 | | | |
| L51 | $r_{11}$ = +139.133 | $d_{11}$ = 3 | $n_{51}$ = 1.69895 | $v_{DS1}$ = | 30.04 |
| L52 | $r_{12}$ = -10.283 | $d_{12}$ = 3.9 | $n_{52}$ = 1.51454 | $v_{DS2}$ = | 54.55 |
| L52 | $r_{13}$ = +9.566 | | | | |

Conditional Expressions

| | | | |
|---|---|---|---|
| $\Sigma p$ = | 0.170 | $e$ = | 1.619 mm |
| $r_1/e$ = | 1.235 | $n_0-n_1$ = | -0.257 |

The specifications of the imaging lens used for evaluating the objective lenses of Example Embodiments 2 and 3 are set forth in Table 4.

TABLE 4

Overall Specifications f = 200 mm
B.f. = 167.438 mm

Lens Specifications

| Lens Element | Curvature Radius (mm) | Axial Distance (mm) | Refractive Index | | Abbe No. |
|---|---|---|---|---|---|
| L20 | $r_{20}$ = +73.038 | $d_{20}$ = 7.05 | $n_{20}$ = 1.61720 | $v_{D20}$ = | 54.01 |
| L21 | $r_{21}$ = -80.027 | $d_{21}$ = 1.75 | $n_{21}$ = 1.74950 | $v_{D21}$ = | 35.19 |
| L21 | $r_{22}$ = +296.026 | $d_{22}$ = 6.5 | | | |
| L22 | $r_{23}$ = +48.003 | $d_{23}$ = 6.8 | $n_{22}$ = 1.72000 | $v_{D22}$ = | 50.19 |
| L23 | $r_{24}$ = -190.064 | $d_{24}$ = 2 | $n_{23}$ = 1.54739 | $v_{D23}$ = | 53.48 |
| L23 | $r_{25}$ = +32.183 | | | | |

Figure 4:
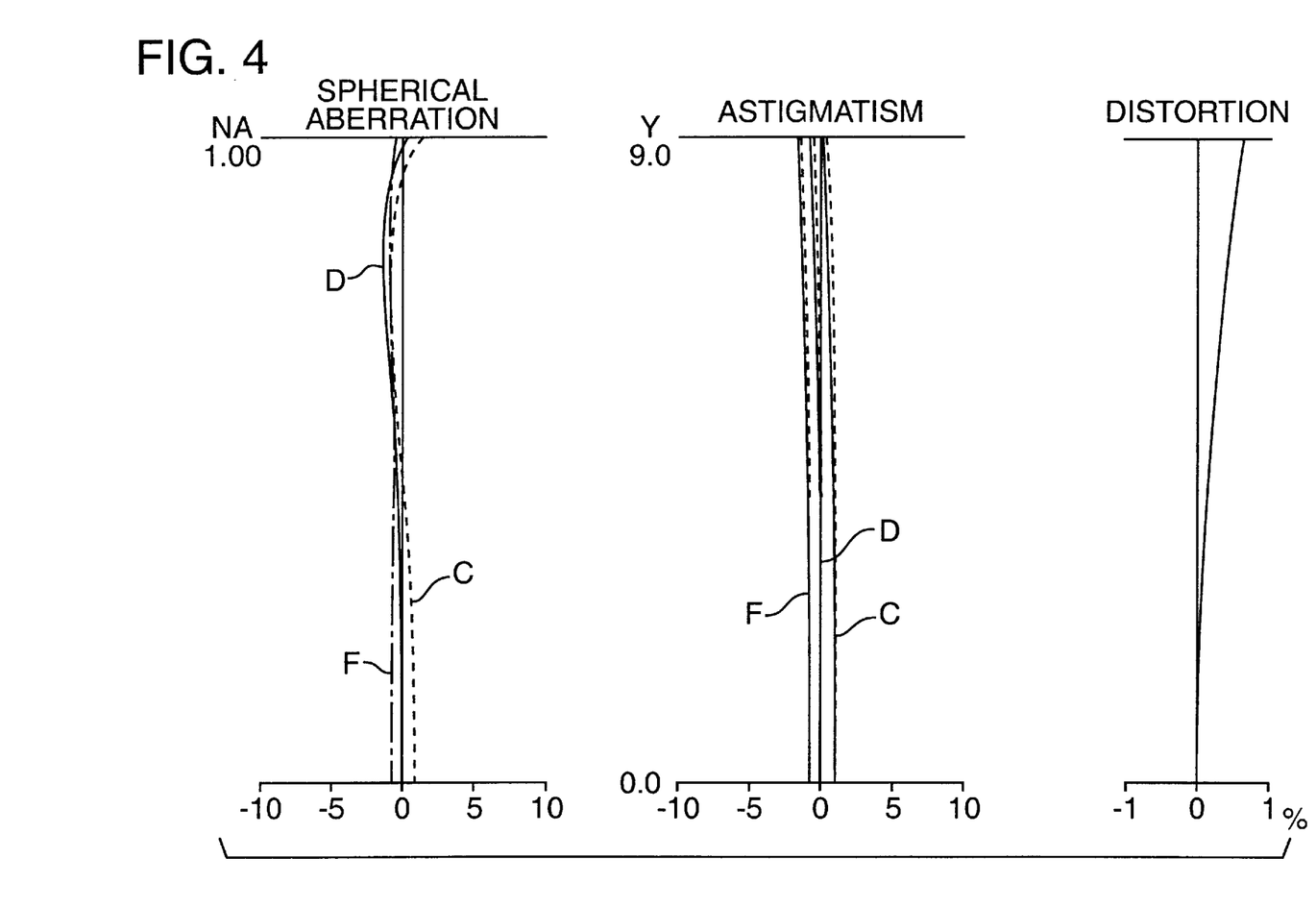
FIG. 4 provides aberration plots for the objective lens of Example Embodiment 1.
Figure 5:
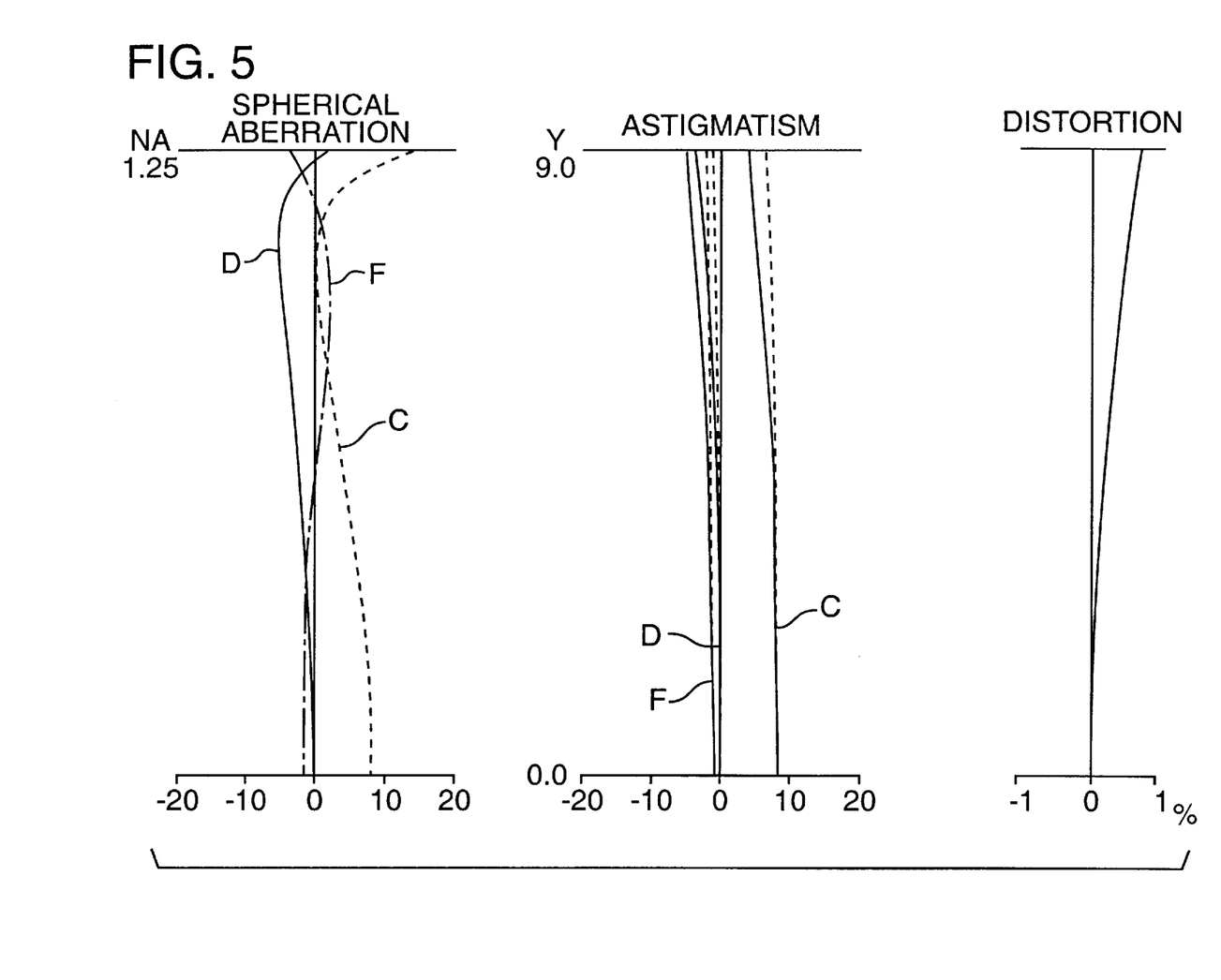
FIG. 5 provides aberration plots for the objective lens of Example Embodiment 2.
Figure 6:
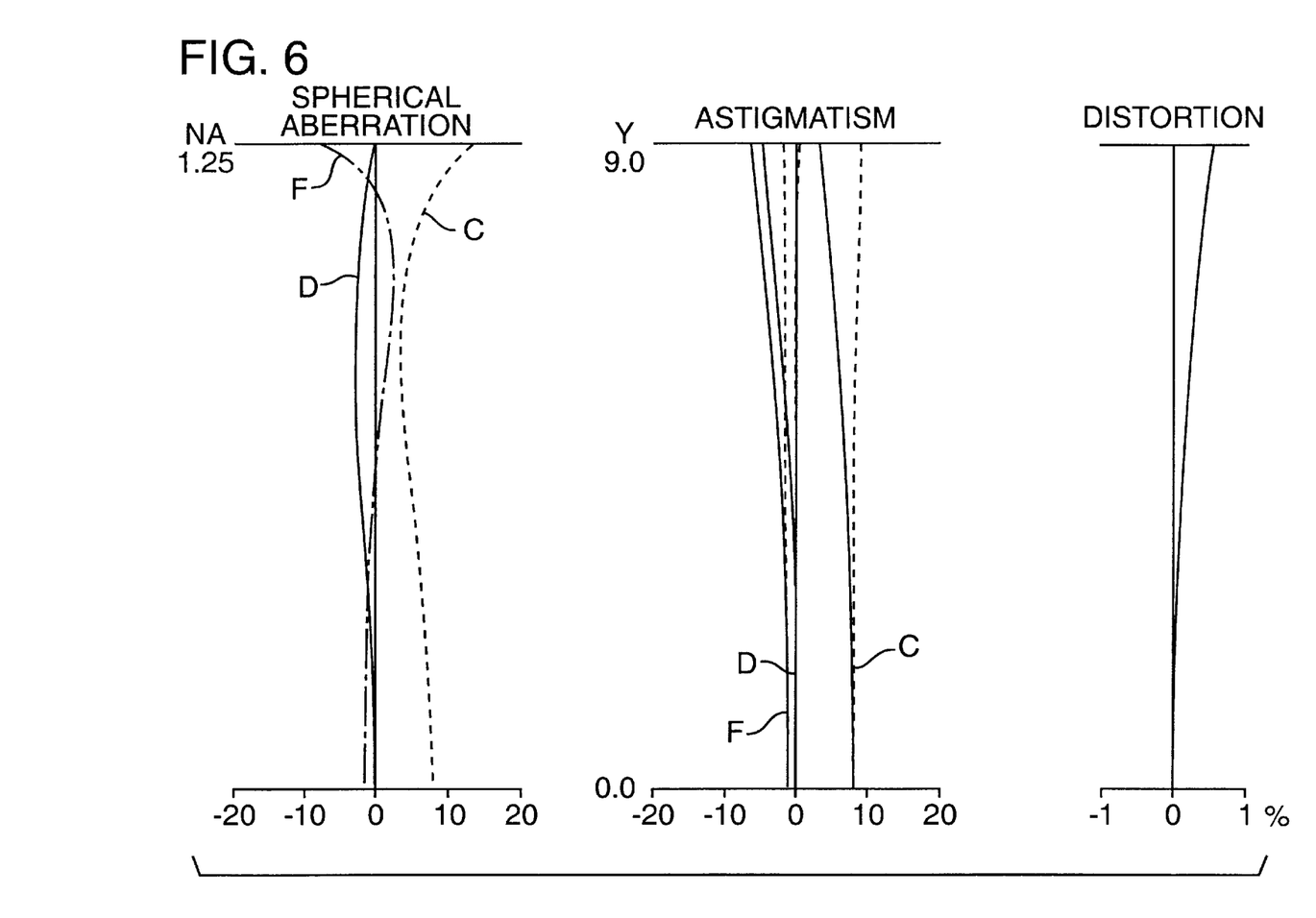
FIG. 6 provides aberration plots for the objective lens of Example Embodiment 3.

Aberration plots for Example Embodiments 1–3 are provided in FIGS. 4–6, respectively. Specifically, FIGS. 4–6 each provide plots of spherical aberration, astigmatism, and distortion. Also, D denotes D-line light, F denotes F-line light, and C denotes C-line light. In the plots of spherical aberration, NA denotes numerical aperture; in the plots of astigmatism, Y denotes the image height, the solid line represents the sagittal image plane, and the dashed line represents the meridional image plane. The vertical axis in the distortion plots corresponds with the vertical axis in the astigmatism plots.

As can be seen from FIGS. 4-6, each of the foregoing Example Embodiments achieves excellent correction of aberrations even though the subject objective lenses have simpler optical configurations than prior-art objective lenses. It is particularly noted that the Petzval's sum, $\Sigma p$, exhibited by each Example Embodiment is small. It can therefore be understood that astigmatism was also effectively corrected.

Therefore, the present invention provides, inter alia, fluid-immersion microscope objective lenses that exhibit good image-plane flatness. The objective lenses have a simpler configuration than in prior-art objective lenses, and are easier to manufacture.

Whereas the invention has been described in connection with a preferred embodiment and Example Embodiments, it will be understood that the invention is not limited to those embodiments. On the contrary, the invention is intended to encompass all alternatives, modifications, and equivalents as may be included within the spirit and scope of the invention as defined by the appended claims.

What is claimed is:

1. A fluid-immersion microscope objective lens, comprising a most objectwise lens element having a most objectwise lens surface, the most objectwise lens surface having a negative refractive power and contacting an immersion fluid during use, the microscope objective lens satisfying the following Conditional Expression:

$|n_0 - n_1| > 0.1$ wherein $n_1$ is the refractive index of the most objectwise lens element and $n_0$ is the refractive index of the immersion fluid.

2. The microscope objective lens of claim 1, further satisfying the following Conditional Expression:

$2 > |r_1/e| > 0.54$ wherein $r_1$ is the curvature radius and e is the effective diameter of the lens surface that contacts the immersion fluid.

3. The microscope objective lens of claim 1, further satisfying the following Conditional Expression:

$1.5 > |r_1/e| > 0.6$ wherein $r_1$ is the curvature radius and e is the effective diameter of the lens surface that contacts the immersion fluid.

4. The microscope objective lens of claim 1, further satisfying at least one of the following Conditional Expressions:

$|n_0 - n_1| > 0.15$, and $2 > |r_1/e| > 0.54$ wherein $r_1$ is the curvature radius and e is the effective diameter of the lens surface that contacts the immersion fluid.

5. The microscope objective lens of claim 1, further satisfying at least one of the following Conditional Expressions:

$|n_0 - n_1| > 0.15$, and $1.5 > |r_1/e| > 0.6$ wherein $r_1$ is the curvature radius and e is the effective diameter of the lens surface that contacts the immersion fluid.

6. The microscope objective lens of claim 1, further satisfying at least one of the following Conditional Expressions:

$|n_0 - n_1| > 0.2$, and $2 > |r_1/e| > 0.54$ wherein $r_1$ is the curvature radius and e is the effective diameter of the lens surface that contacts the immersion fluid.

7. The microscope objective lens of claim 1, further satisfying at least one of the following Conditional Expressions:

$|n_0 - n_1| > 0.2$, and $1.5 > |r_1/e| > 0.6$ wherein $r_1$ is the curvature radius and e is the effective diameter of the lens surface that contacts the immersion fluid.

8. A fluid-immersion microscope objective lens, comprising a most objectwise lens element having a lens surface that is concave relative to the object side and contacts an immersion fluid during use, the microscope objective lens satisfying the following Conditional Expression:

$|n_0 - n_1| > 0.1$ wherein $n_1$ is the refractive index of the most objectwise lens element, and $n_0$ is the refractive index of the immersion fluid.

9. The microscope objective lens of claim 8, further satisfying the following Conditional Expression:

$2 > |r_1/e| > 0.54$ wherein $r_1$ is the curvature radius and e is the effective diameter of the lens surface that contacts the immersion fluid.

10. The microscope objective lens of claim 8, further satisfying the following Conditional Expression:

$1.5 > |r_1/e| > 0.6$ wherein $r_1$ is the curvature radius and e is the effective diameter of the lens surface that contacts the immersion fluid.

11. The microscope objective lens of claim 8, further satisfying at least one of the following Conditional Expressions:

$|n_0 - n_1| > 0.15$, and $2 > |r_1/e| > 0.54$ wherein $r_1$ is the curvature radius and e is the effective diameter of the lens surface that contacts the immersion fluid.

12. The microscope objective lens of claim 8, further satisfying at least one of the following Conditional Expressions:

$|n_0 - n_1| > 0.15$, and $$1.5 > |r_1/e| > 0.6$$

wherein $r_1$ is the curvature radius and e is the effective diameter of the lens surface that contacts the immersion fluid.

13. The microscope objective lens of claim 8, further satisfying at least one of the following Conditional Expressions:

$$|n_0 - n_1| > 0.2, \text{ and}$$

$$2 > |r_1/e| > 0.54$$

wherein $r_1$ is the curvature radius and e is the effective diameter of the lens surface that contacts the immersion fluid.

14. The microscope objective lens of claim 8, further satisfying at least one of the following Conditional Expressions:

$$|n_0 - n_1| > 0.2, \text{ and}$$

$$1.5 > |r_1/e| > 0.6$$

wherein $r_1$ is the curvature radius and e is the effective diameter of the lens surface that contacts the immersion fluid.

15. A fluid-immersion microscope objective lens, comprising multiple lens components including a single lens element that is the most objectwise lens element of the objective lens, the single lens element having a refractive index $n_1$ and a most objectwise lens surface of negative refractive power, said single lens element contacting an immersion fluid during use, the objective lens satisfying the Conditional Expression: $|n_0 - n_1| > 0.1$, wherein $n_0$ is the refractive index of the immersion fluid.

16. The microscope objective lens of claim 15, further satisfying the Conditional Expression: $2 > |r_1/e| > 0.54$, wherein $r_1$ is the curvature radius and e is the effective diameter of the most objectwise lens surface.

* * * * *

UNITED STATES PATENT AND TRADEMARK OFFICE
CERTIFICATE OF CORRECTION

PATENT NO. : 5,805,346

DATED : September 8, 1998

INVENTOR(S) : Kei Tomimatsu

It is certified that error appears in the above-identified patent and that said Letters Patent is hereby corrected as shown below:

Column 4, line 5, "$\nu D$" should be --$\nu_D$--.

Signed and Sealed this

Nineteenth Day of October, 1999

Attest:

Q. TODD DICKINSON

*Attesting Officer*     *Acting Commissioner of Patents and Trademarks*